United States Patent [19]
Paesold

[11] Patent Number: 5,157,547
[45] Date of Patent: Oct. 20, 1992

[54] TRANSPARENT COATING HAVING A MEDIUM REFRACTIVITY

[75] Inventor: Gerold Paesold, Triesen, Liechtenstein

[73] Assignee: Balzers Aktiengesellschaft, Balzers, Liechtenstein

[21] Appl. No.: 604,657

[22] Filed: Oct. 26, 1990

[30] Foreign Application Priority Data

Nov. 6, 1989 [CH] Switzerland ............... 3994/89-0

[51] Int. Cl.$^5$ ............................... G02B 5/28
[52] U.S. Cl. ............................ 359/581; 359/586; 359/589
[58] Field of Search ............. 359/580, 581, 586, 589

[56] References Cited
U.S. PATENT DOCUMENTS 3,185,020 5/1965 Thelen ........................ 359/586
3,604,784 9/1971 Louderback ................. 359/586
3,804,491 4/1974 Morokuma et al. ......... 359/586

*Primary Examiner*—Bruce Y. Arnold
*Assistant Examiner*—J. P. Ryan
*Attorney, Agent, or Firm*—Notaro & Michalos

[57] ABSTRACT

In order to coat a substrate by a transparent coating of a medium refractivity, consisting substantially of at least one metal oxide mixture a coating of an at least substantially homogenous mixture of up to about 80 percent by weight praseodymium oxide and the balance aluminum oxide is used. The coating includes 20 to 88 percent by weight, preferably 30 to 80 percent by weight praseodymium oxide. This reflection reducing transparent reflection reducing transparent coating having at least one metal oxide mixture is specifically suitable for the coating of optical substrates.

12 Claims, 3 Drawing Sheets

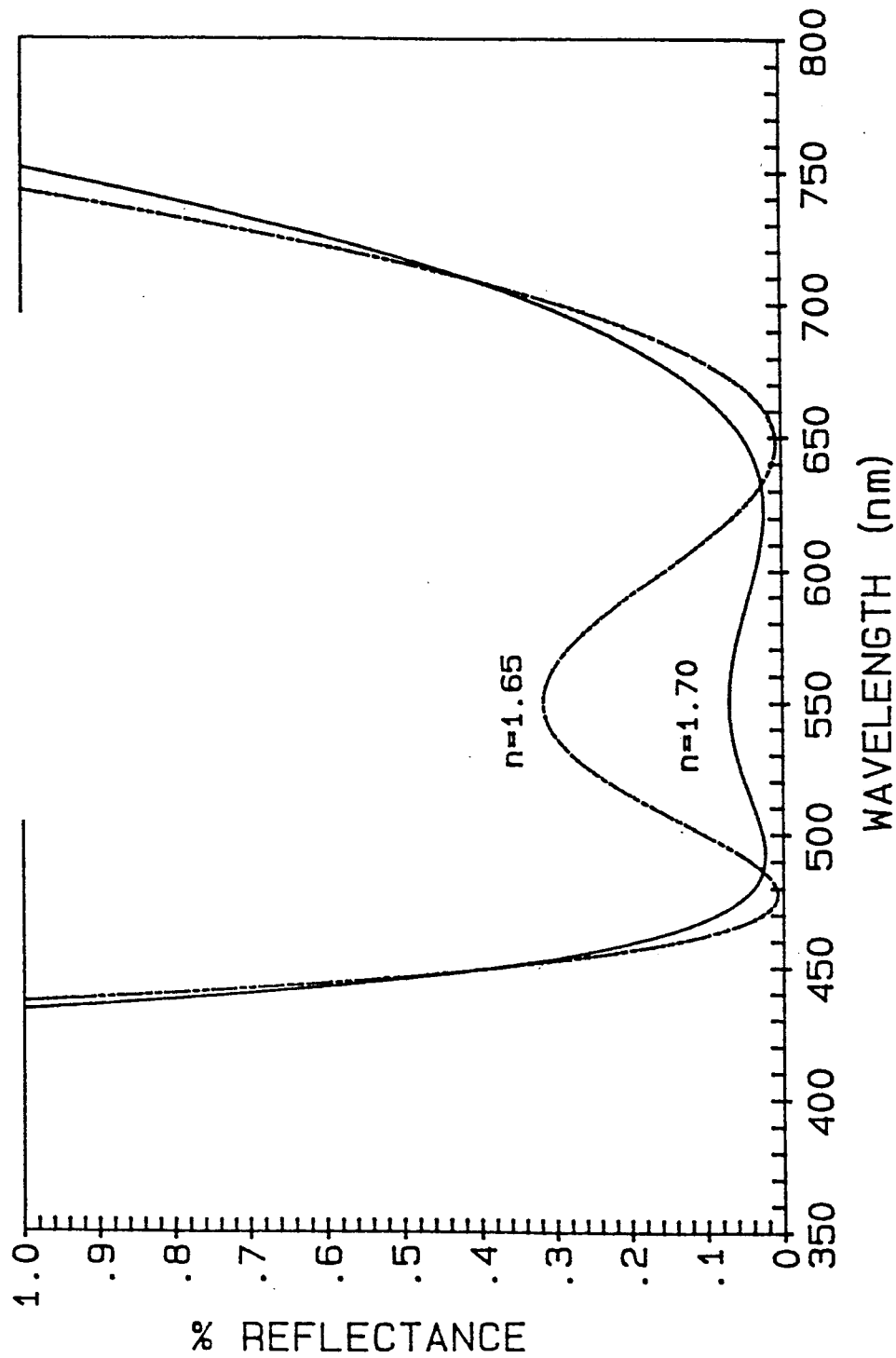

TRANSPARENT COATING HAVING A MEDIUM REFRACTIVITY

BACKGROUND OF THE INVENTION

1. Field of the Invention

The present invention relates to a transparent coating having a medium refractivity, consisting substantially of at least one metal oxide mixture. It relates further to a method of producing a transparent coating, with an optical substrate having at least one reflection reducing transparent coating, and to a reflection reducing multi-layer coating for the reduction of the reflection at an optical substrate, including at least one transparent coating or layer, of a medium refractivity, consisting of at least one metal oxide mixture.

2. Description of the Prior Art

Thin oxide layers are widespread in technical engineering matters as protective layers and as layers for optical purposes. In the case of protective layers, they serve to protect sensitive surfaces of bodies, e.g. precision parts of precision engineering products, of lenses, surface mirrors or similar structures against corrosion and mechanical damage. In the optical industry oxide layers are additionally used as high and low refractivity layers for reflection reducing coatings, further for interference filters, ray dividers, heat filters, cold light mirrors, coatings for eyeglasses and similar items. The mechanical and optical properties of such oxide layers do not only depend on the kind of the oxide which has been deposited but rather exeedingly on the kind of the depositing method. Accordingly, e.g. optical glasses having a refractivity generally in the range between 1.4 and 1.8 are given reflection reducing coatings for a reduction of the reflection losses.

For the treatment of optical substrates such as lenses, prisms, filters, etc. the earlier predominantly deposited single and double layers are superseded due to the introduction of process controlled plants also in the mass production by the qualitatively better multi-layers. The substrates of the optical field which are to be treated are generally anorganic and organic glasses which encompass a large range of refractivity in the magnitude of $n=1.4$ to 1.8. In contrast thereto, multi-layer systems for the reduction of losses of the refractivity display their optimal effect merely in a relatively narrow refractivity range. For this reason the above mentioned total range has been divided into two portions, a so called low refraction range below $n=1.6$ and a higher refraction range with $n=1.6$. For both range portions different layer systems were used accordingly for the reduction of the reflection.

The division of the refraction range into two range portions is, however, quite coarse and because the reflection reducing effect still occured optimally in both range portions only in narrow portion parts, it was necessary to come to compromises for substrates with refractivities at which no optimal reduction of the reflection was possible.

It also has been found that when using two layer systems the vapor depositing apparatuses had to be converted and differing method steps followed which obviously is undesireable regarding production techniques. Quite often such lead to errors and a reduction of the quality.

Following these shortcomings there is thus the desire to equip optical substrates with reflection reducing multi-layers whereby in order to optimize the reflection reducing effect this multi-layer is to be adjusted by simple procedures to the refractivity of the optical body to be coated such that the above mentioned technically unsufficient solution must no longer be used.

Refection reducing multi-layer coatings are known since a long time. The U.S. Pat. No. 3,185,020 discloses a triple-layer coating of the type $\lambda/4-\lambda/2-\lambda/4$ whereby a $\lambda/4$ layer is to be understood as being the product of thickness of layer x refractivity, where the optimal thickness of the layer amounts to one quarter of the reference wave length.

The known multi-layer coatings encorporate the problem that dependent from the refractivity of the substrate the layer closest to the substrate must have a refractivity in the range of 1.65 to 1.8. Substances having good mechanical properties and incorporating this refractivity are, however, not known.

In order to solve this problem differently use was for instance made of the known fact that it is possible to substitute a symmetric triple-layer system for a $\lambda/4$ layer of arbitrary refractivity. Accordingly, multi-layer systems are arrived at whereby the refractivity of the composite $\lambda/4$ layer is adjustable by the thickness of the layer of the individual layers. The drawback of this possible solution is that when producing a plurality of layers an increased number of error sources is present at any rate and that problems of condensation can arise at the partly very thin part layers, and that due to the larger number of layers the duration of the charge is increased.

In accordance with the proposition to deposit mixtures of high and low refractory substances the German published patent application DE-AS 21 54 030 disclosed for instance a multi-layer coating in which mixtures of cerfluoride and ceroxide or mixtures of cerfluoride and zinc sulfide are used. The literature discloses further mixtures of ceroxide and silicon oxide, zinc sulfide and magnesium fluoride, zinc sulfide and natrium aluminum hexafluoride and ceroxide and magnesium fluoride. Because all of these known systems include, however, at least one component which is known not to be satisfactory regarding mechanical properties and stability, the described systems are not suitable for the production of reflection reducing multi-layer coatings having the required qualities, specifically regarding mechanical properties and stability.

General information regarding the use of layers of oxide mixtures are, furthermore, to be found in the DE-OS 20 50 556, DE-OS 24 57 474, DE-OS 28 27 856, U.S. Pat. No. 3,604,784 and GB-PS 13 80 793. All these disclosures describe, however, high refractive $\lambda/2$ center layers of a homogeneous structure and accordingly non-changing refractivity. Propositions for an optimizing of the reduction of the reflection by at least one layer of medium refractivity located closest to the substrate are not contained in any of these disclosures.

The DE-OS 27 20 742 discloses also a multi-layer coating consisting of a combination of $Al_2O_3$-layers with $NdF_3$ and $MgF_2$-layers. Oxide-mixtures for these layers are, however, not described.

The DE-PS 30 09 533 discloses a coating which consists of a mixture of tantalum oxide and aluminum oxide and includes the requisite refractivity. This mixture is conditionally suitable indeed, has however in spite thereof some deficiencies. Because tantalum has a relatively low affinity to oxygen it is quite difficult to completely oxidize same during the vapor deposition. Conclusively, a relatively high partial pressure of $O_2$ must be selected. It has additionally been found that the refractivity changes during the vapor deposition and this is undesirable.

The DE-PS 1 228 489 discloses also a oxide mixture of titanium oxide and oxides of the group rare earths which, however, leads apart from an excellent oxidizability specifically to a high refractivity $n>2$.

SUMMARY OF THE INVENTION

A general object of the present invention is to provide a coating having a medium refractivity on the basis of metal oxide mixtures for a reduction of the reflectance of optical substates and of which the refractivity is adjustable and where the oxide mixture which initially has been set within the said limits does not change regarding its composition during the vapor deposition, thus where no fractionized evaporating of one of the members of the oxide mixture occurs.

A further object is to provide a coating mixture which is easily oxidizable such that the vapor deposition may be made at a low oxygen partial pressure of about $5 \times 10^{-5} - 1 \times 10^4$ mbar oxygen.

Yet a further object is to provide a coating consisting of a at least substantially homogeneous mixture of up to about 80 percent by weight of praseodymium and the balance aluminum oxide.

Still a further object is to provide a method of producing a transparent coating by means of an electron gun in vacuum and at a reactive atmosphere, in which the coating having a medium refractivity is produced by depositing a mixture of 0-80 percent by weight praseodymium and the balance aluminum oxide.

A further object of the invention is to provide a coating as reflection reducing layer on a optical substrate, where specifically the optical substrate is equipped with a reflection reducing multi-layer coating having an interference action which multi-layer coating includes, beside the layer having a medium refractivity, a further layer having a low refractivity and if needed additional layers having a high refractivity, whereby at least one layer having a medium refractivity is the layer immediately adjacent to the substrate.

It has surprisingly been found that a mixture of 0-80 percent by weight praseodymium and the balance consisting of aluminum oxide gives a homogeneous layer having a medium refractivity and the other desirable properties.

Aluminum oxide in the form of $Al_2O_3$ has a refractivity of $n=1.62$ while praseodymium oxide has a refractivity of $n=2.05$. The mixture of the oxides allows a covering of the desired range from $n=1.65$ to $n=1.90$. A rising content of praseodymium in the mixture leads to a rising refractivity of the layer such that depending from the optical substrate and the desired refractivity a suitable mixture can be produced.

It has been found that mixtures of aluminum oxide and praseodymium oxide exhibit an excellent adherance on glass. The layer has excellent mechanical and chemical properties. The coating is, furthermore, wear resistant and scratch resistant and also not sensitive to moisture and changing climate. The chemical resistance such as e.g. against salt water and organic solvents is excellent.

The coating according to the invention consisting of the two oxides shows, which was not to be expected, a homogeneous structure and accordingly a constant refractivity over the entire thickness of the layer. When applying the coating in accordance with the invention consisting of aluminum oxide and praseodymium oxide in multi-layers, neither the sequence of the layers nor the optical thickness of the layer of one or several layers of the layer system must be changed; it is merely necessary to apply a mixture of aluminum oxide and praseodymium oxide which has been optimized relative to the substrate. Due to this possibility of optimizing the layer of praseodymium oxide and aluminum oxide it is possible to produce layer systems which guarantee a maximal reduction of the reflection.

By means of such and by using the inventive coating it is possible to equip optical substrates of any kind with reflection reducing multi-layer coatings. These substrates or optical bodies such as lenses, prisms, filter and similar can feature various refractivities, generally, however positioned between 1.4 and 1.8.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 illustrates a corresponding reflectance curve such as in FIG. 2, however on a substrate with a refractivity of 1.6.

DESCRIPTION OF THE PREFERRED EMBODIMENTS

The optical refractivities which are selected depending from the refractivity of the substrate by a certain mixture of aluminum oxide and praseodymium oxide can now be determined easily.

This will be now explained based on the above mentioned $\lambda/4-\lambda/2-\lambda/4$-triple layer coating with reference to the appended drawings.

Reflectance curves for the entire refractivity range of optical substrates were calculated whereby only the refractivity of the layer with the medium refractivity immediately adjacent the substrate was taken as variable. The refractivities for the center layer with a high refractivity of $n=2.35$ and for the outermost layer with a low refractivity of $n=1.38$ were set as constant.

Figure 1:
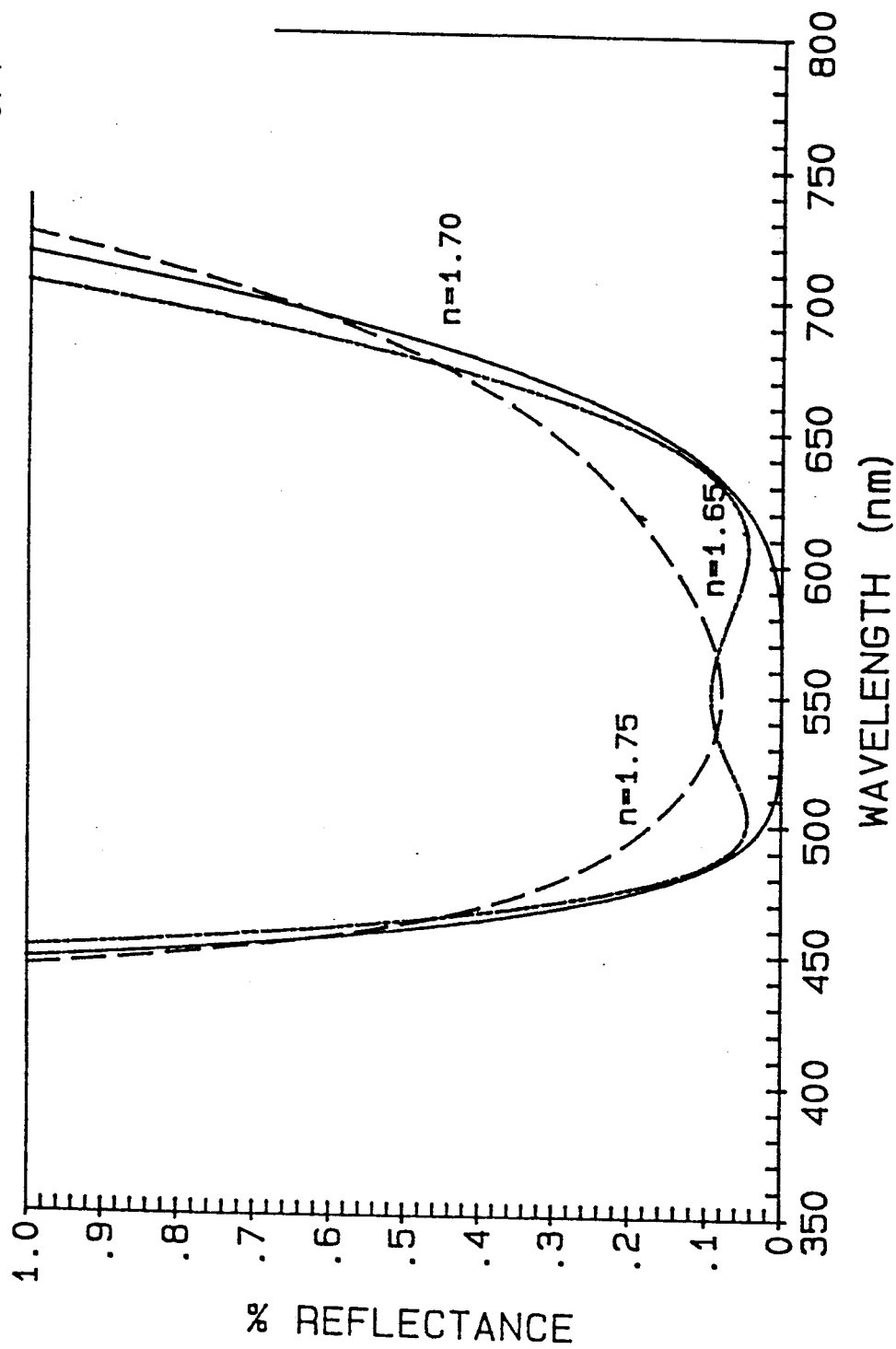
FIG. 1 illustrates the reflectance curves which correspond to the refractivities $n\ 1=1.65$, $n\ 1=1.70$ and $n\ 1=1.75$ whereby the refractivity of the substrate amounts to $n_s=1.52$.
Figure 2:
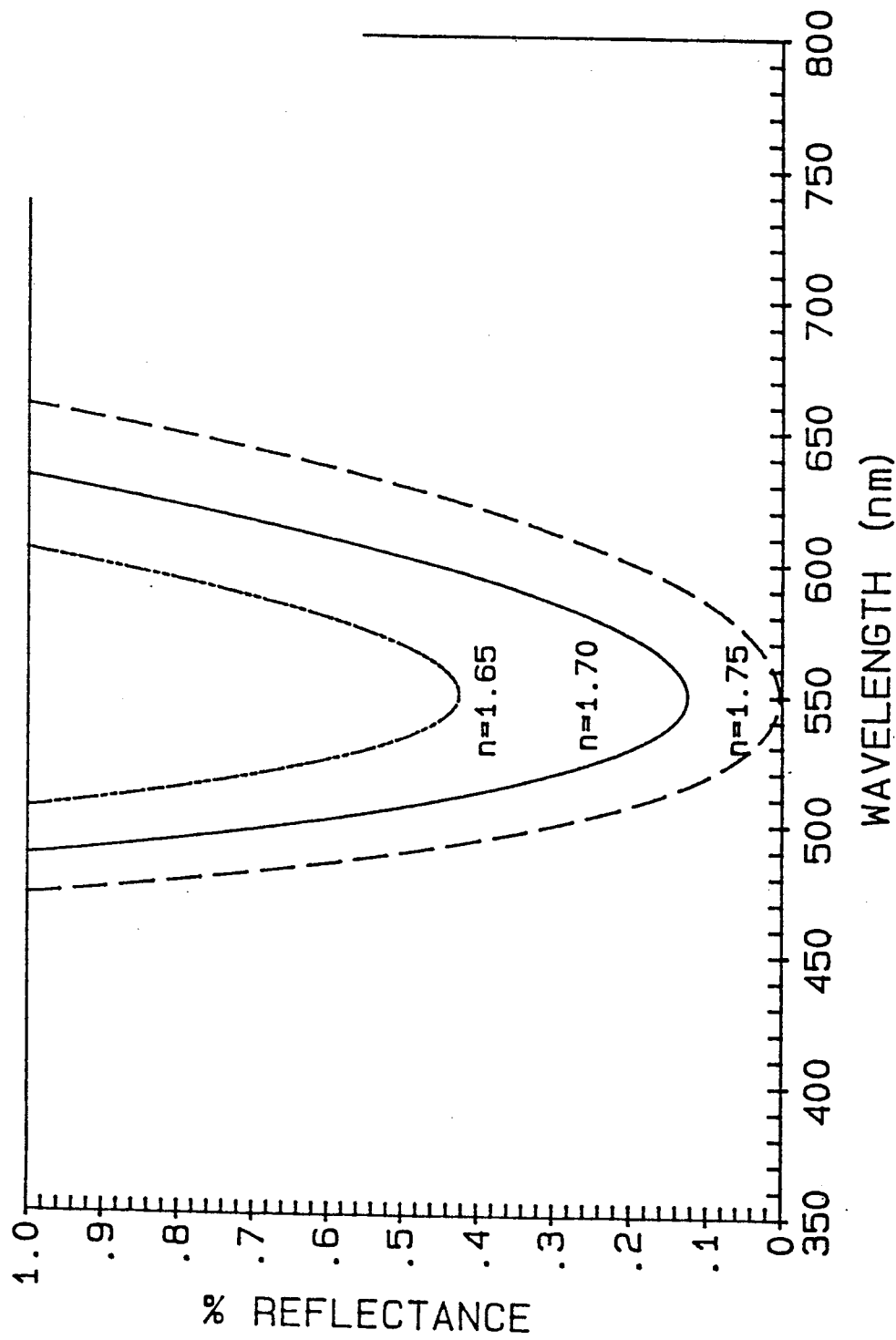
FIG. 2 illustrates the corresponding reflectance curves at a variable medium refracting layer with $n\ 1=1.65$; $n\ 1=1.70$ and $n\ 1=1.75$, at a high refracting layer remining constant, with a refrctivity of $n\ 2=2.1$ and the outermost layer with a low refractivity to $n\ 2=1.38$ and a refractivity of the substrate of $n=1.52$.

The reflectance curves which are arrived at various refractivities of the substrate are illustrated in the FIGS. 1-3.

All illustration reveal clearly that when setting of a specific refractivity of the layer $n\ 1$ with a medium refractivity an optimal reduction of the reflectance can be reached.

A further example of an application describes the possibility to select any possible refractivity between $n=1.62$ to $n=1.90$. The material is suitable as surface anti-reflection coating for substrates having a high refractivity, such as silicon, gallium arsenide and similar materials. The surface reflection is a quadratic function of the indices of refraction of the film.

R is thereby expressed as $$R = \left[ \frac{n_0(n_s - n_f^2)}{n_0(n_s + n_f^2)} \right]^2, \tag{1}$$

whereby $n_0$ = the index of refraction of the ambient medium (air, $n_0 = 1.0$), $n_s$ = the index of refraction of the substrate ($n_s$ 0 3.5 for gallium arsenide), and $n_f$ = the index of refraction of the film.

This equation can be written in s simplyfied form as:

$$R \sim (n_f - 1.87) \tag{2}$$

By a precise setting of the index of refraction of the reflecting layer it accordingly is possible to have the surface reflectance moving towards 0.

While there are shown and described present preferred embodiments of the invention, it is to be distinctly understood that the invention is not limited thereto, but may be otherwise variously embodied and practiced within the scope of the following claims.

I claim:

1. A transparent coating having a medium refractivity, consisting substantially of at least one metal oxide mixture, said coating consisting of an at least substantially homogeneous mixture of up to about 80 percent by weight of praseodymium oxide and the balance aluminum oxide.

2. The transparent coating of claim 1, in which said coating consists of about 20 to 80 percent by weight of praseodymium oxide.

3. The transparent coating of claim 2, in which said coating consists of about 30 to 80 percent by weight of praseodymium oxide.

4. A method of producing a transparent coating consisting substantially of at least one metal oxide mixture by a depositing by evaporation by means of a electron gun in vacuum and at a reactive atmosphere, comprising a depositing of a mixture of up to about 80 percent by weight of praseodymium oxide and the balance consisting of aluminum oxide.

5. An optical substrate having at least one reflection reducing transparent coating consisting of an at least substantially homogeneous mixture of up to about 80 percent by weight of praseodymium oxide and the balance aluminum oxide.

6. The optical substrate of claim 5, wherein said coating consists of about 20 to 80 percent by weight of praseodymium oxide.

7. The optical substrate of claim 6, wherein said coating consists of about 30 to 80 percent by weight of praseodymium oxide.

8. A reflection reducing multi-layer coating for the reduction of the reflection at an optical substrate, including at least one transparent coating having a medium refractivity, consisting of at least one metal oxide mixture, said coating consisting of an at least substantially homogeneous mixture of up to about 80 percent by weight of praseodymium oxide and the balance aluminum oxide, where said reflection reducing multi-layer coating has an interference effect, wherein additionally to said at least one transparent coating having a medium refractivity, at least one further layer having a lower refractivity than the at least one transparent coating is present, and wherein at least one of said at least one transparent coating having a medium refractivity is located closest to said optical substrate.

9. The reflection reducing multi-layer coating of claim 8, comprising further at least one additional layer having a refractivity which is higher than the refractivity of said at least one transparent coating.

10. The reflection reducing multi-layer coating of claim 9, in which the thickness of said at least one additional layer having a higher refractivity is less than the thickness of the other layers.

11. The reflection reducing multi-layer coating of claim 8, in which at least one of said at least one further layers having a lower refractivity consists of magnesium fluoride.

12. The reflection reducing multi-layer coating of claim 8, in which at least one of said at least one transparent coating having a medium refractivity consists of a mixture of about 20 to 80 percent by weight praseodymium oxide and about 20 to 80 percent by weight of aluminum oxide.

* * * * *